United States Patent [19]

van Gils et al.

[11] 3,877,066

[45] Apr. 8, 1975

[54] COLOUR TELEVISION DISPLAY APPARATUS

[75] Inventors: Cornelis Johannes van Gils; Louis Johannes van Mal, both of Emmasingel, Eindhoven, Netherlands

[73] Assignee: U.S. Philips Corporation, New York, N.Y.

[22] Filed: Oct. 25, 1973

[21] Appl. No.: 409,418

Related U.S. Application Data

[63] Continuation of Ser. No. 241,242, April 5, 1972, abandoned.

[52] U.S. Cl. .............................................. 358/18

[51] Int. Cl. ............................................ H04n 9/44

[58] Field of Search ....... 178/5.4 P, 5.4 SY; 358/16, 358/17, 18, 14

[56] References Cited

UNITED STATES PATENTS 3,553,357 1/1971 Carnt ............................... 178/5.4 P

FOREIGN PATENTS OR APPLICATIONS 1,212,710 11/1970 United Kingdom ............. 178/5.4 P

OTHER PUBLICATIONS

Japanese Publ. No. 12215/71, 12/28/67.

*Primary Examiner*—Robert L. Richardson
*Attorney, Agent, or Firm*—Frank R. Trifari; Henry I. Steckler

[57] ABSTRACT

A synchronization circuit for a PAL or SECAM TV receiver has a reversing switch. The switch is operated by generator synchronized with only the horizontal frequency sync signals at that frequency. This eliminates the need for half line frequency identification signals to be applied to said switch.

12 Claims, 16 Drawing Figures

COLOUR TELEVISION DISPLAY APPARATUS

This is a continuation, of application Ser. No. 241,242, filed Apr. 5, 1972 now abandoned.

The invention relates to colour television display apparatus for displaying a colour television signal in which the nature of a colour information signal varies from line to line, comprising a chrominance channel which includes a change-over switch controlled by a change-over signal generator for matching the chrominance channel from line to line with the nature of the colour information signal to be processed.

Such a receiver is known, for example, from United Kingdom Patent Specification No. 1,138,911. The change-over signal generator in this receiver is given its correct switching state with the aid of a signal of half the line frequency, a so-called identification signal.

It is an object of the invention to provide an entirely novel change-over system several embodiments of which have different advantages.

According to the invention colour display apparatus of the kind described in the preamble is characterized in that the change-over signal generator is exclusively controlled by a signal of line frequency which is derived from a line synchronizing signal present in the television signal to be processed.

Matching of the chrominance channel with the nature of the colour information signal to be processed may be effected by using an additional change-over switch in PAL or SECAM receivers or by using two subcarrier regenerators for PAL receivers.

Figure 1:
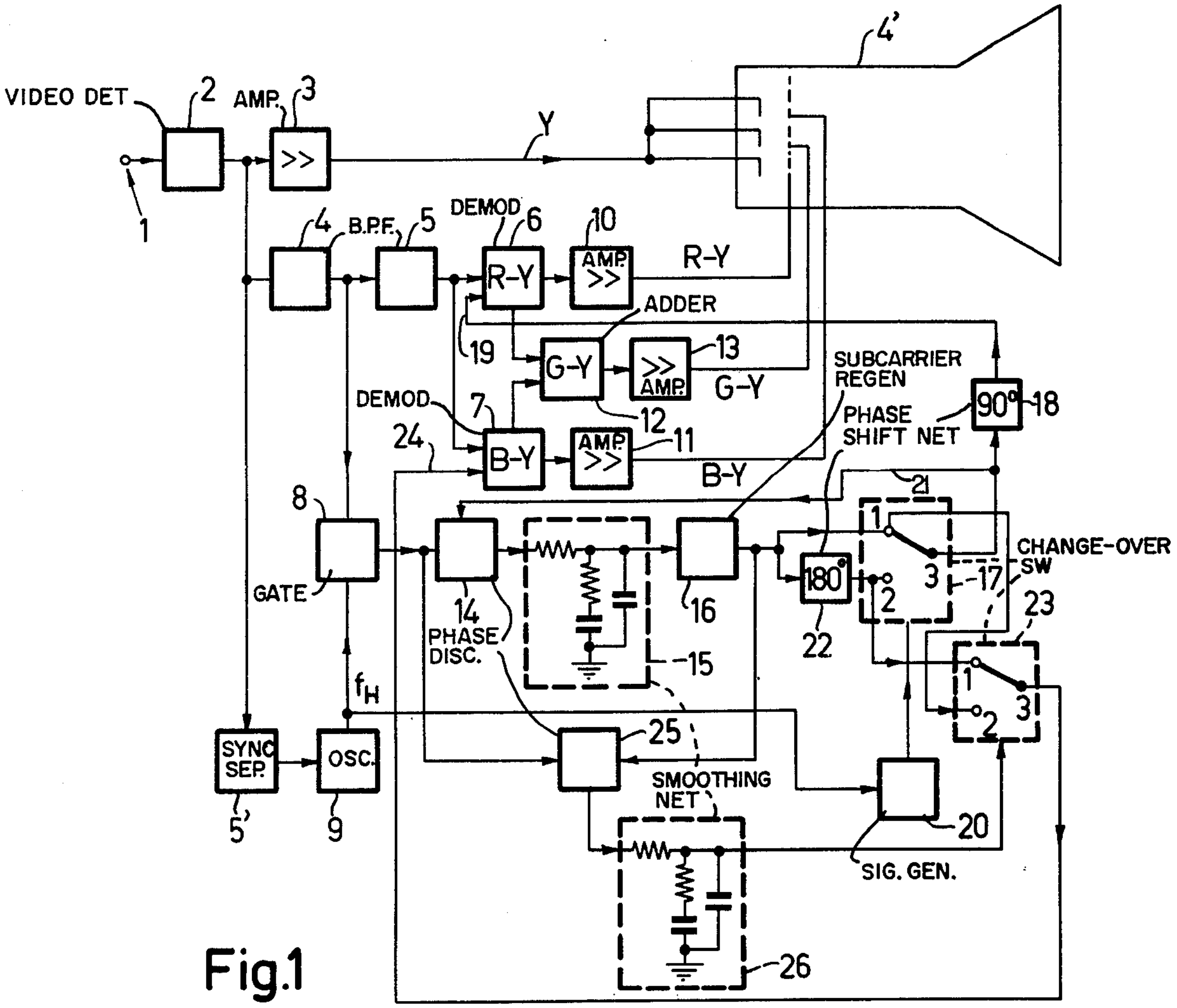
Figure 2:
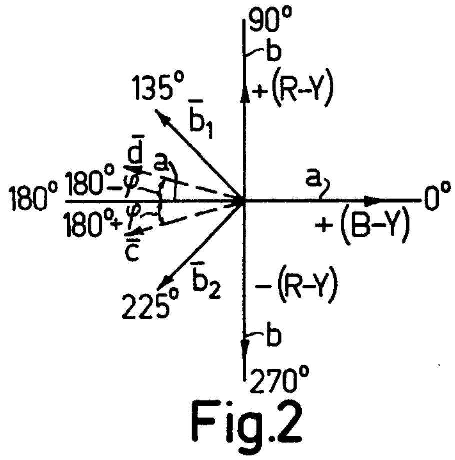
Figure 3:
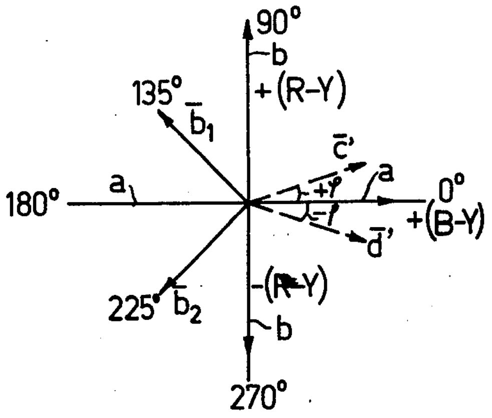
Figure 4:
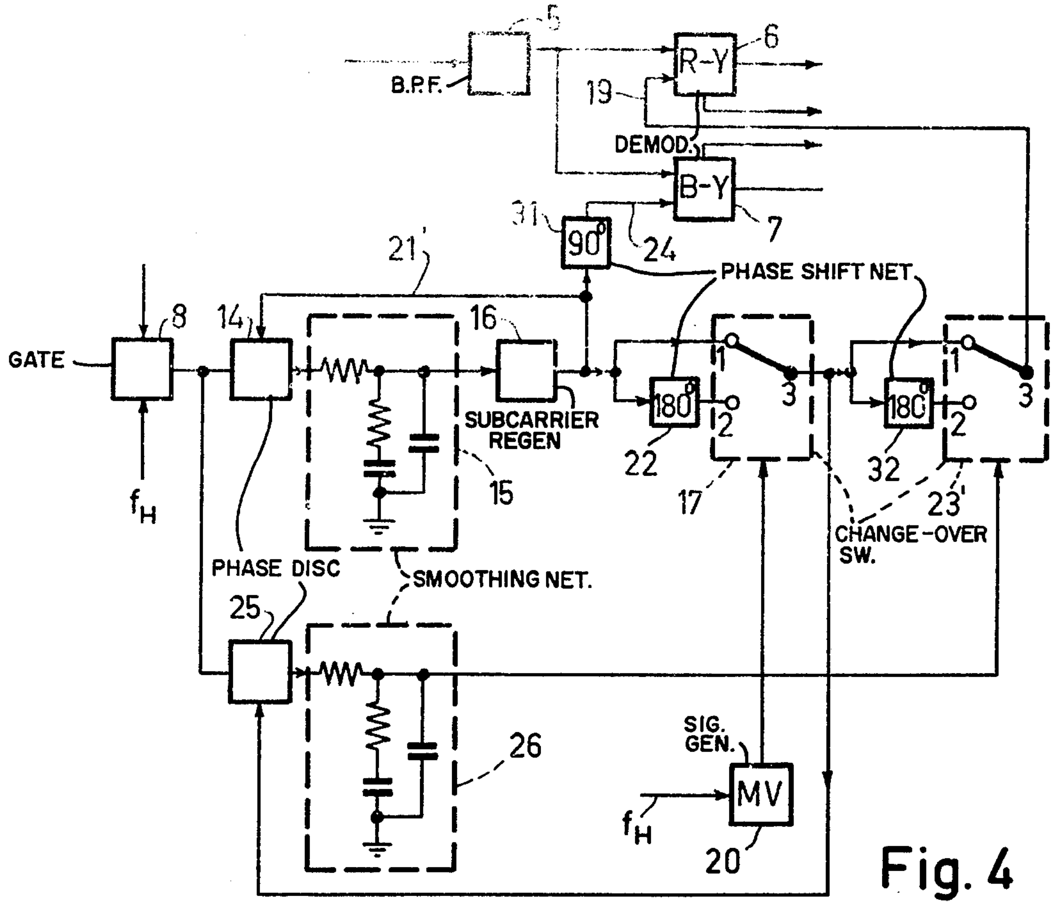
Figures 5, 6:
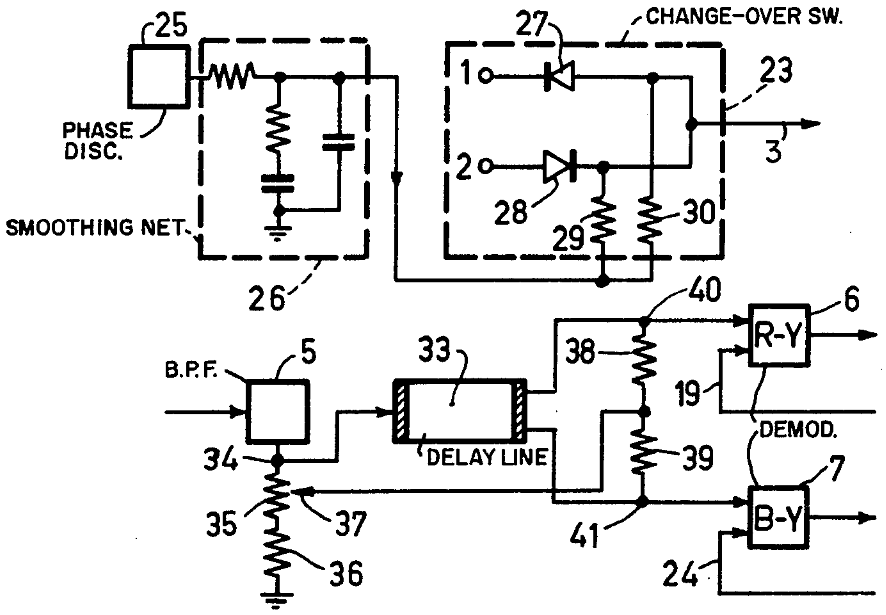
Figures 7A, 7B, 7C:
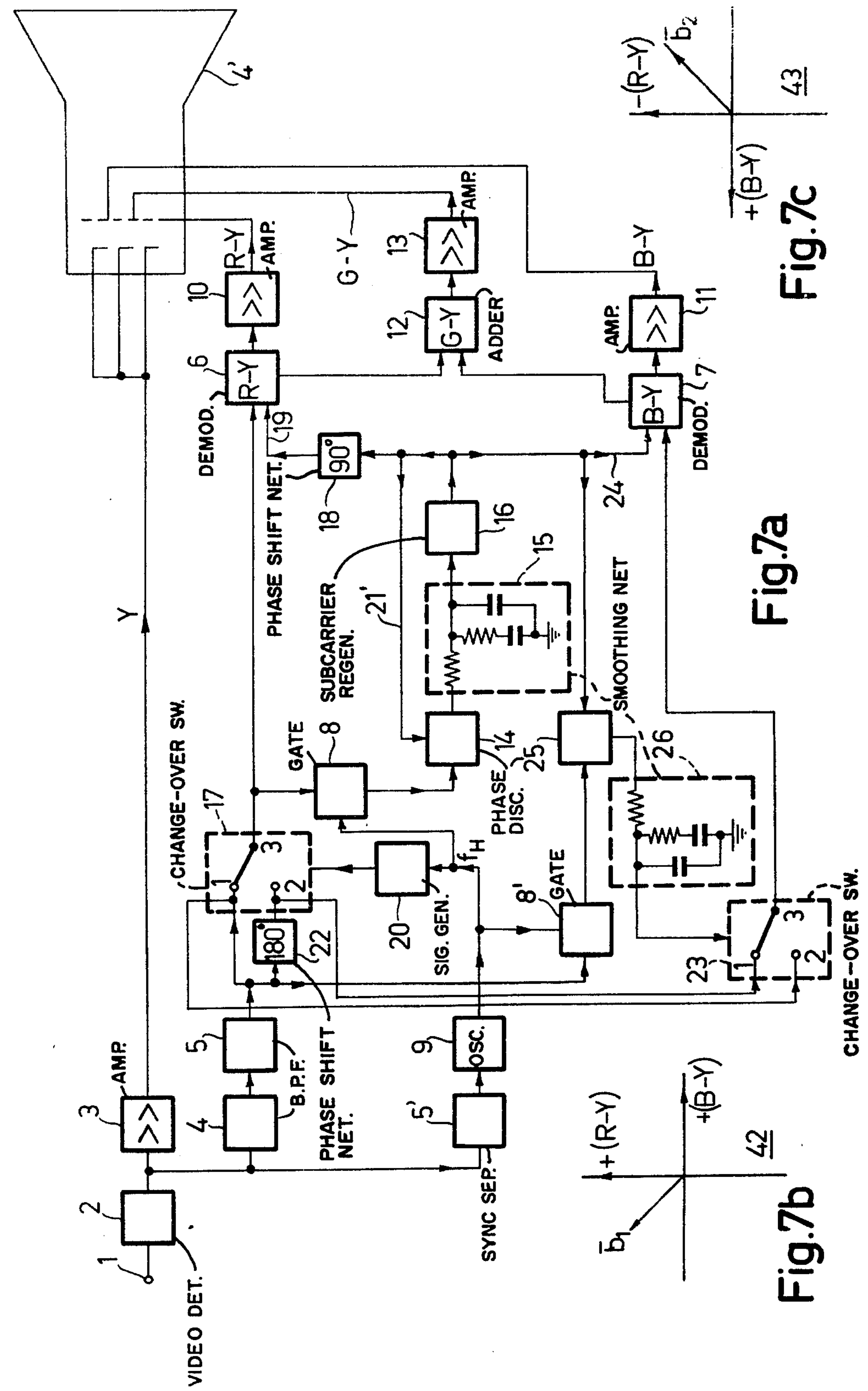
Figure 8:
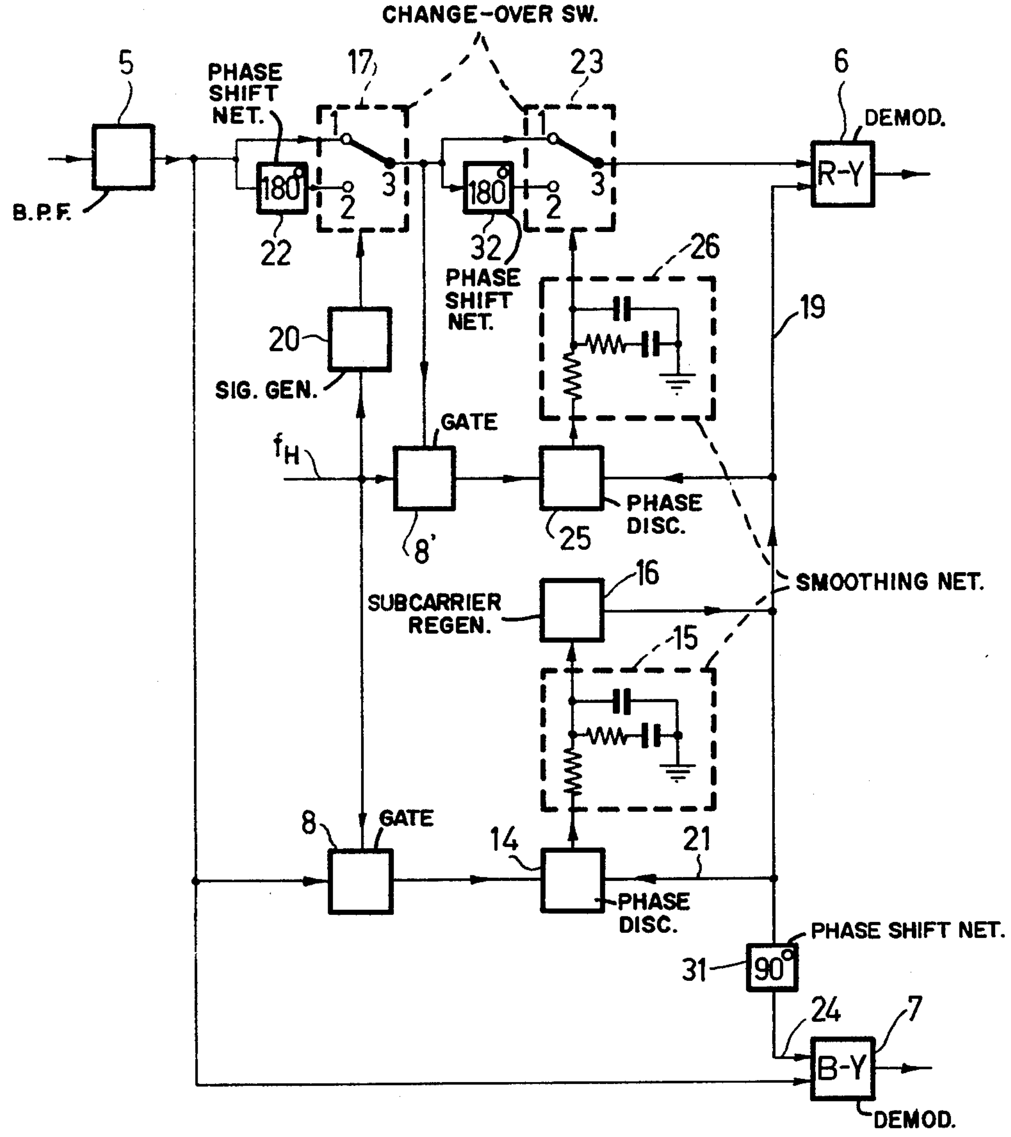
Figures 9, 10:
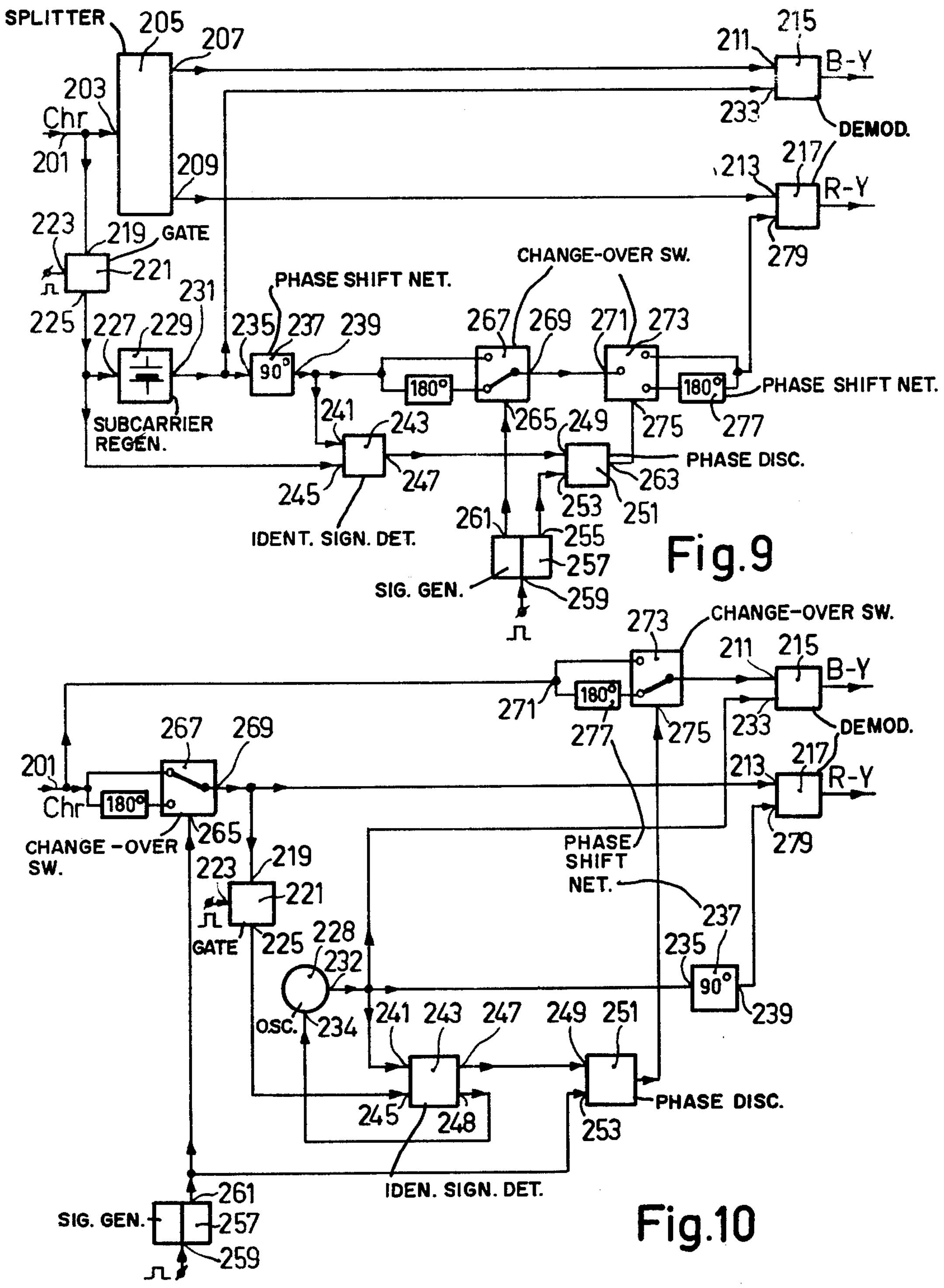
Figure 11:
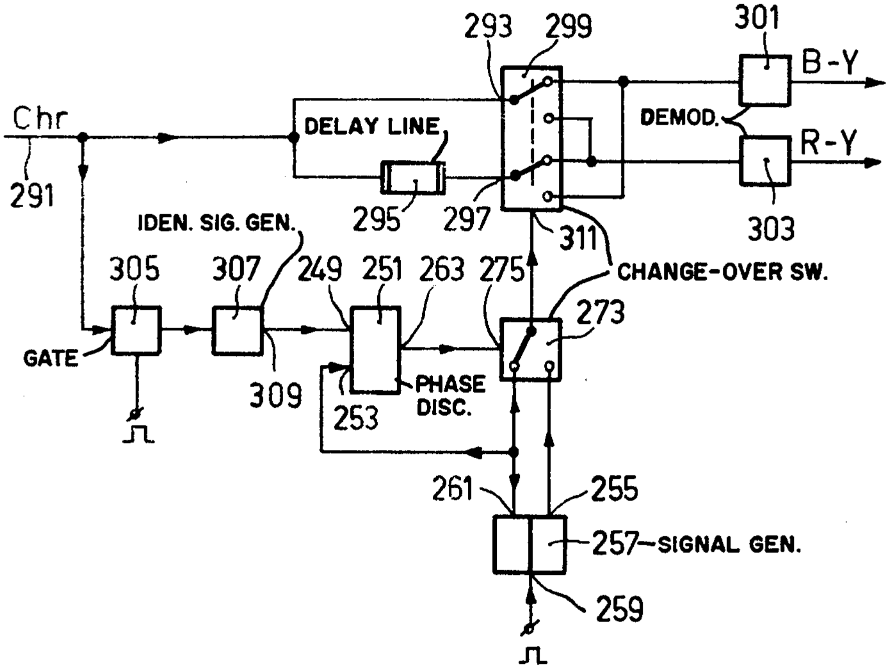
Figures 12, 13:
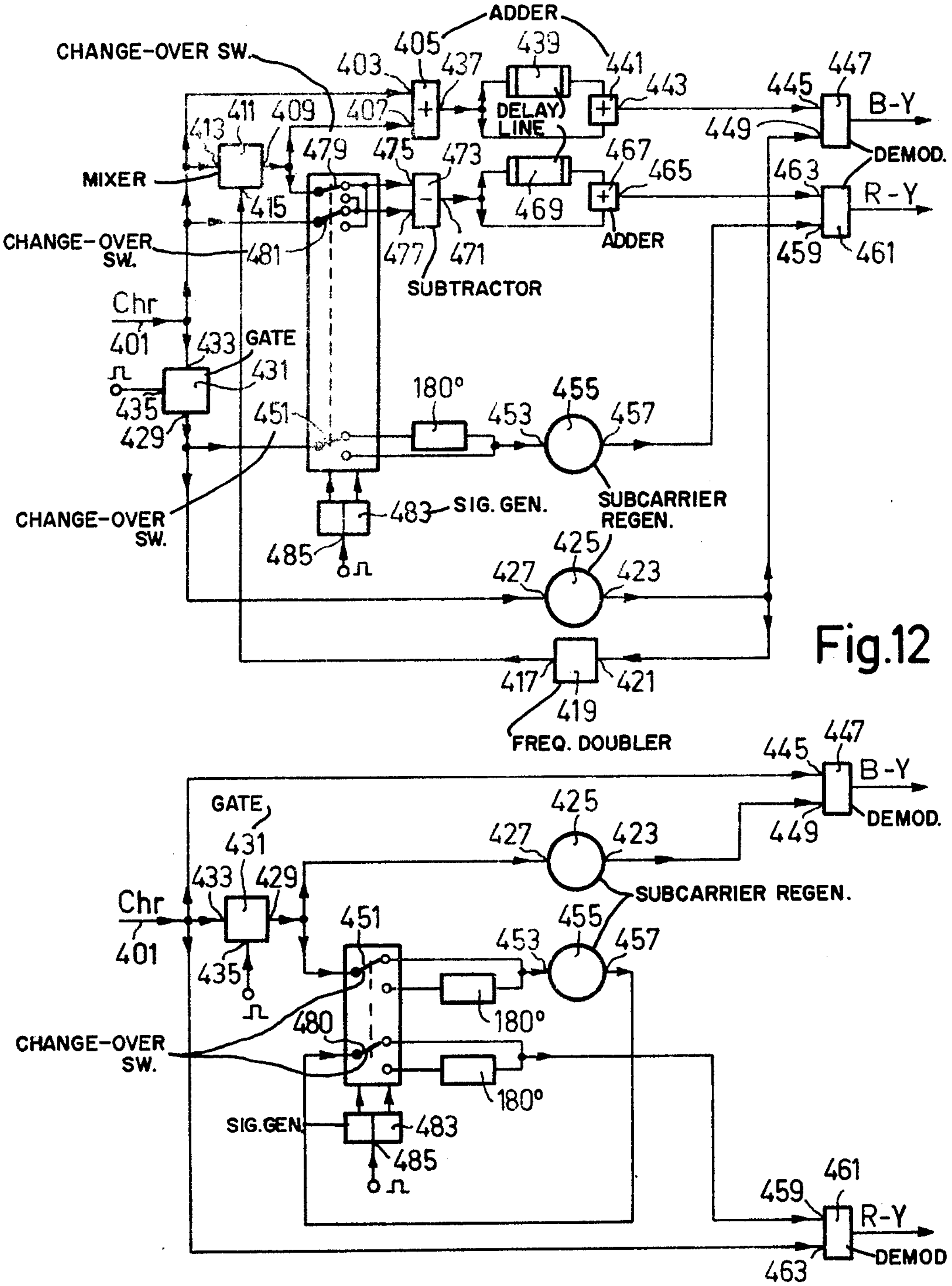
Figure 14:
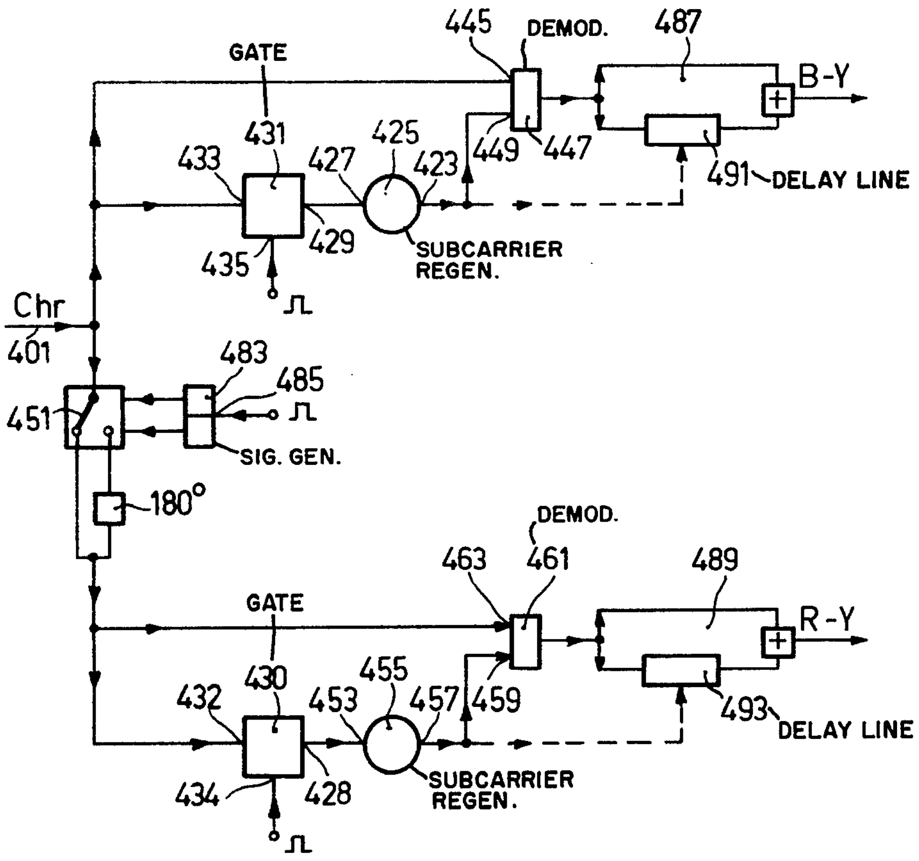

Some possible embodiments of colour television display apparatus according to the invention will be described with reference to the accompanying Figures in which:

FIG. 1 shows a block schematic diagram of a first embodiment of part of a PAL colour television receiver according to the invention including a direct voltage identification circuit in which the supply paths from the subcarrier oscillator to the demodulators incorporate change-over switches, FIGS. 2 and 3 show phasor diagrams relating to the PAL colour television signal as can be received with a receiver according to the invention, FIG. 4 shows a part of a block schematic diagram of a second embodiment in which the change-over switches are likewise incorporated in the supply paths for the subcarrier signal, FIG. 5 shows a possible embodiment of the second change-over switch diagrammatically shown in FIGS. 1 and 4, FIG. 6 shows a possible embodiment of a PAL decoder when the receiver is designed in accordance with the PAL-de-luxe principle and FIGS. 7*a* through 7*c* and FIG. 8 show further embodiments in which the change-over switches are present in the supply paths for the chrominance signals, FIG. 9 shows a block schematic diagram of part of the chrominance channel in a PAL receiver according to the invention including a colour identification circuit of half the line frequency, FIG. 10 shows a block schematic diagram of a further embodiment of part of a chrominance channel in a PAL receiver according to the invention, including a colour identification circuit of half the line frequency, FIG. 11 likewise shows a block schematic diagram of part of a chrominance channel for a SECAM receiver according to the invention including a colour identification circuit of half the line frequency, FIG. 12 shows a non-detailed block schematic diagram of a PAL demodulator without an identification circuit for display apparatus according to the invention, FIG. 13 shows a non-detailed block schematic diagram of a second possible embodiment of a PAL demodulator without an identification circuit for display apparatus according to the invention, FIG. 14 likewise shows a non-detailed block schematic diagram of an embodiment of a PAL demodulator without an identification circuit for display apparatus according to the invention and including only one phase inverter.

In FIG. 1 a terminal 1 receives an amplified intermediate frequency television signal which after reception, transformation and amplification is available at terminal 1 in an RF section and an IF section of the receiver. This signal is detected in a video detector 2 and is subsequently applied to a first amplifier 3 which selects the luminance signal Y from the detected signal and applies this signal to the cathodes of a colour television display tube 4'. The combined video signal derived from detector 2 is also applied to a bandpass filter 4 which selects the colour components from the received signal. Likewise the signal derived from detector 2 is applied to a synchronizing separator 5' which separates the synchronizing signals from the video signal. The colour signal derived from bandpass filter 4 is applied in the first place to a second bandpass filter 5 which amplifies the colour signal and applies it to a first demodulator 6 for demodulating the red colour difference signal (R−Y) and to a second demodulator 7 for demodulating the second blue colour difference signal (B−Y). Secondly, the colour signal is applied to a gating circuit 8 which is keyed by means of a pulsatory signal of line frequency $f_H$ which is derived from an oscillator 9 which in turn is synchronized by the line synchronizing pulses derived from the synchronizing separator 5'.

The red colour difference signal (R−Y) derived from the first demodulator 6 is amplified in an amplifier 10 and is subsequently applied to the Wehnelt cylinder of the red gun of the display tube 4'. Similarly the blue colour difference signal (B−Y) derived from demodulator 7 is amplified in an amplifier 11 and is applied to the Wehnelt cylinder of the blue gun of the display tube 4'. Furthermore two signals are derived from demodulators 6 and 7 which signals are applied to an adder circuit 12 so as to form the green colour difference signal G−Y which signal is applied after amplification in an amplifier 13 to the Wehnelt cylinder of the green gun of the display tube 4'. In this conventional manner it is achieved that the display tube 4' receives both the luminance signal and its three colour difference signals R−Y, B−Y and G−Y so that a colour picture on the screen of the tube 4' can be displayed.

It is however, necessary that for a correct demodulation of the red colour difference signal R−Y a subcarrier signal is applied to the demodulator 6 which not only has the correct phase but also alternates 180° in phase from line to line. To achieve this the synchronizing circuit of FIG. 1 includes a first phase discriminator 14, a first smoothing network 15, a chrominance subcarrier regenerator 16, hereinafter referred to as oscillator, a change-over switch 17 and a phase-shifting network 18 through which path the chrominance subcarrier signal generated in the oscillator 16 is applied to the input 19 of the synchronous demodulator 6.

The change-over switch 17 is in turn controlled by a change-over signal generator 20 which is controlled by means of the line-frequency signal of frequency $f_H$ derived from oscillator 9. The change-over signal generator 20 is, however, not synchronized separately by means of a signal derived from a phase discriminator, i.e., the change-over signal generator 20, apart from the control by means of the line-frequency signal, is free running. Consequently the position of switch 17 may be arbitrary and is not adapted to the phase of the red colour difference signal R–Y which alternates 180° in phase from line to line as is evident from FIGS. 2 and 3. To ensure that demodulator 6 receives the chrominance subcarrier signal with the correct phase, this first embodiment according to the principle of the invention includes a control loop by means of the conductor 21 which passes the chrominance subcarrier signal derived from the output terminal 3 of switch 17 back to an input of the phase discriminator 14. It will be described hereinafter that the demodulator 6 then actually receives the chrominance subcarrier signal in a manner adapted to the received colour television signal.

As is known, the blue colour difference component (B–Y) in the PAL colour television signal is modulated on the chrominance subcarrier at the so-called zero-degree phase (the part of the horizontal line *a* to the right of the vertical line *b* in FIGS. 2 and 3). This means that a regenerated subcarrier signal of this 0° phase must always be applied to the synchronous demodulator 7 if this demodulator is to demodulate the blue colour difference component (B–Y) correctly.

The red colour difference component (R–Y) is modulated on the chrominance subcarrier at the so-called 90° phase for one line (this is the part of line *b* above line *a* in FIGS. 2 and 3 in which the red colour difference component is denoted by +(R–Y)) and is modulated at the so-called 270° phase during the subsequnt line (which is the part of line *b* below line *a* in FIGS. 2 and 3 in which the red colour difference component is denoted by –(R–Y)). This means that during one line the regenerated subcarrier signal at the 90° phase position must be applied to synchronous demodulator 6 and must be applied at the 270° phase position during the other line.

The colour television signal according to the PAL system also includes a so-called alternating burst. This means that during a line period, hereinafter referred to as the first line period, during which the +(R–Y) component is transmitted a burst $\bar{b}_1$ is transmitted during the line back porch associated with this line period, which burst is modulated on a subcarrier at a phase of 135°. During the subsequent line period, hereinafter referred to as the second line period, during which the –(R–Y) component is transmitted a burst $\bar{b}_2$ is transmitted during the line back porch associated with this line period, which burst is modulated on the subcarrier at a phase of 225°, etc.

Let it be assumed that the oscillator 16 is synchronized in such a manner that its output signal has the phase (180° + $\phi$) as denoted by the phasor *c* in FIG. 2. It is furthermore assumed that the switch 17 is in its correct position for the reception of the +(R–Y) component associated with the relevant line. In this case the switch 17 must have the position shown in FIG. 1 while the output contact 3 is connected to the input contact 1. For the output voltage at contact 3 of switch 17 we can then write:

$$V_{17} = \sin(W_h t + 180° + \phi) \tag{1}$$

(For the sake of simplicity all amplitudes are hereinafter assumed to be 1).

In equation (1) $W_h = 2\pi f_h$ in which $f_h$ is the subcarrier frequency. As will be evident, equation (1) indicates the output signal of oscillator 16 at the given position of switch 17.

The burst associated with the +(R–Y) component is:

$$B_1 = \sin(W_h t + 135°) \tag{2}$$

For this first line there consequently applies for the output voltage of phase discriminator 14:

$$V_{14} = \sin(W_h t + 180° + \phi)\cdot\sin(W_h t + 135°) = \frac{\cos(45° + \phi)}{2} \tag{3}$$

In this equation (3) the component with $2W_h t$ is omitted because ultimately the output voltage of smoothing network 15 is concerned and this network does not pass the component with $2W_h$ anyway.

The switch 17 is switched in the rhythm of the line by means of the control signal derived from change-over signal generator 20 so that during the second line period switch 17 connects the contacts 2 and 3 together. The output signal from oscillator 16 then reaches contact 3 through the 180° phase-shifting network 22 so that there applies for this second line period:

$$V_{17} = \sin(W_h t + \phi) \tag{4}$$

The –(R–Y) component and the burst are associated with this second line period:

$$b_2 = \sin(W_h t + 225°) \tag{5}$$

The output voltage of phase discriminator 14 for this second line period is therefore:

$$V_{14} = \sin(W_h t + \phi)\cdot\sin(W_h t + 225°) = -\left\{\frac{\cos(45° - \phi)}{2}\right\} \tag{6}$$

The smoothing network 15 has such a long time constant relative to one line period that the output voltage of phase discriminator 14 is always maintained long enough to determine that the total output voltage of smoothing network 15 is the sum of the voltages given by equations (3) and (6). This means that:

$$V_{15} = \frac{\cos(45° + 5) - \cos(45° - 5)}{2} = \frac{\sqrt{2}}{2}\sin\phi \tag{7}$$

For a positive angle $\phi$ (phasor $\overline{c}$ in FIG. 2) the output voltage of network 15 is therefore negative. Oscillator 16, possibly in combination with a built-in reactance circuit, must react to this negative voltage in such manner that the angle $\phi$ is readjusted to zero as much as possible; this means that the phasor $\overline{c}$ is turned clockwise to the part of line $a$ located on the left of line $b$.

For a negative angle $\phi$, the case of phasor $\overline{d}$ of FIG. 2 the output voltage will be $$V_{15} = -\frac{\sqrt{2}}{2}\sin(-\phi) = \frac{\sqrt{2}}{2}\sin\phi \qquad (8)$$

This means that the output voltage becomes positive and phasor $a$ is likewise turned counterclockwise to the part of line $a$ located on the left of line $b$. This is a stable state for the described switching phase of change-over switch 17. Consequently, for the phase of changing-over change-over switch 17 the output voltage of oscillator 16 is always equal to $$V_{16} = \sin(W_h t + 180°) \qquad (9)$$

Here the ideal case is assumed in which $\psi$ is entirely readjusted to 0.

For the first line period when the +(R–Y) component and the burst $\overline{b}_1$ occur, change-over switch 17 is in position 1 → 3 and the signal according to equation (9) is passed directly through filter 18 which delays the phase over 90° and is located exactly at the correct phase so as to demodulate the +(R–Y) component synchronously in the demodulator 6.

For the second line period, when the –(R–Y) component and the burst $\overline{b}_2$ occur, change-over switch 17 is in position 2 → 3 and the signal will obtain the correct phase through the phase-shifting networks 22 and 18 so as to demodulate the –(R–Y) component in demodulator 6.

When on the other hand change-over switch 17 changes at a different phase the following situation would occur.

Let it be assumed that during the first line period, i.e., the period when the +(R–Y) component and the burst $\overline{b}_1$ occur, change-over switch 17 is in a position in which the contacts 2 and 3 are connected together. If it is further assumed that the oscillator 16 is synchronized in the phase which corresponds to the phasor $\overline{c}$, the following equation applies to the output signal from oscillator 16:

$$V_{16} = \sin(W_h t + 180° + \phi) \qquad (9')$$

Therefore there applies for output contact 3

$$V_{17} = \sin(W_h t + \phi) \qquad (10)$$

represented by the phasor $\overline{c}'$ in FIG. 3.

The output voltage of phase discriminator 14 then becomes $$V_{14} = \sin(W_h t + \phi)\cdot\sin(W_h t + 135°) = \frac{\cos(135° - \phi)}{2} \qquad (11)$$

At the second line the change-over switch 17 is reversed to the position 1 → 3 so that there applies:

$$V_{17}\sin(W_h t + 180° + \phi) \qquad (9'')$$

while also the –(R–Y) component and the burst $\overline{b}_2$ occur. The output voltage of discriminator 14 then becomes $$V_{14} = \sin(W_h t + 180° + \phi)\cdot\sin(W_h t + 225°) = \frac{\cos(45° - \phi)}{2} \qquad (12)$$

For the output voltage of network 15 we thus find:

$$V_{15} = \frac{\cos(135° - \phi)\cdot\cos(45° - \phi)}{2} = \frac{\sqrt{2}}{2}\sin\phi \qquad (13)$$

This means that under these conditions a positive output voltage is provided by the smoothing network 15 at a positive angle $\phi$ so that the control circuit tends to turn the phasor counterclockwise. This means that the phasor $\overline{c}'$ is adjusted to the portion of line $a$ located on the left of line $b$. As a result the output voltage at contact 3 of change-over switch 17 for a position 2 → 3 after termination of the control process is given by:

$$V_{17} = \sin(W_h t + 180°) \qquad (14)$$

This is exactly the correct phase because after a shift over 90° in network 18 the phase associated with a first line period is again obtained for the demodulation of the +(R–Y) component.

For the output signal of oscillator 16 there applies that contact 2 is connected through the phase-shifting network 22 to the output of oscillator 16:

$$V_{16} = \sin W_h t \qquad (15)$$

For a second line period change-over switch 17 is set to the position 1 → 3 so that there applies:

$$V_{17} = \sin W_h t \qquad (16)$$

Since during this second line period the –(R–Y) component occurs the signal given by equation (16) has exactly the correct phase so that after passing network 18 the –(R–Y) component can be synchronously demodulated in the demodulator 6.

When for the case where switch 17 is in the position 2 → 3 during a first line period associated with a +(R–Y) component and a burst $\overline{b}_1$, the output voltage at contact 3 of switch 17 corresponds to the phasor $\overline{d}'$, in FIG. 3 this applies to a negative angle $-\phi$.

The following equation is then found with the aid of equation (13) for the output voltage of network 15:

$$V_{15} = \frac{\sqrt{2}}{2}\sin(-\phi) = -\frac{\sqrt{2}}{2}\sin\phi \qquad (17)$$

This means that the phasor $\overline{d}'$ is adjusted clockwise to the portion of line $a$ located on the left of line $b$. Therefore exactly the same situation is obtained as described with reference to phasor $\overline{c}'$. It follows that also for a phase of the change-over in which during a first line period upon the occurrence of the +(R−Y) component and the burst $\overline{b}_1$ the switch 17 is in position 2 → 3 and is in position 1 → 3 during the second line period upon the occurrence of the −(R−Y) component and the burst $\overline{b}_2$, a stable situation has again been obtained on the understanding that the phase of the output signal from oscillator 16 is now located at the portion of line *a* to the right of line *b*.It is therefore unimportant in what phase the change-over switch 17 switches because the control loop constituted by means of the connection 21 automatically ensures that the carrier signal at the input 19 always has the correct phase.

The situation for the carrier signal which must be applied to the second demodulator 7 is now considered. It has been found in the foregoing that the carrier signal provided by oscillator 16 may assume both the phase given by equation (9) and that given by equation (15). The carrier signal which is to be applied to demodulator 7 should, however, have the phase given by equation (15). It is therefore not readily possible to apply the signal from oscillator 16 to demodulator 7.

A possible solution to this problem may be the provision of a second regenerator or oscillator which may be adjusted with the aid of a second phase discriminator. This solution is rather costly because such an oscillator must be a crystal oscillator. Such solutions are described with reference to FIGS. 12 to 14. The embodiment of FIG. 1 provides a different solution. To this end a second switch 23 is provided whose input contacts 1 and 2 are connected to the input contacts 2 and 1, respectively, of switch 17.

The voltage derived from output contact 3 of switch 23 is applied to an input 24 of demodulator 7. Switch 23 need not be switched in a given rhythm but is to be set in its correct position as a function of the phase of the output signal from oscillator 16. This is effected with the aid of a second phase discriminator 25 to which both the burst signal derived from gate 8 and the carrier signal generated in oscillator 16 are applied. The output voltage of phase discriminator 25 is applied as a control voltage to switch 23 through a smoothing network 26 having a time constant which is long relative to one line period.

When switch 17 switches in a rhythm at which during the first line period contacts 1 and 3 are connected together while during a second line period contacts 2 and 3 are connected together, the phase as given by equation (9) applies for the phase of the output signal from oscillator 16. Since, as assumed in the foregoing, the burst $\overline{b}_1$ occurs during a first line period and the burst $\overline{b}_2$ occurs during a second line period, the output voltage of phase discriminator 25 will be positive in that case because the projections of the phasors $\overline{b}_1$ and $\overline{b}_2$ are positive on the part of line *a* located to the left line *b*. Consequently a positive voltage is applied to switch 23 which voltage sets switch 23 in the 1 → 3 position. Since, as stated, the output voltage of oscillator 16 will have the phase given by equation (9), this signal will reach the input 24 of demodulator 7 after it has passed network 22 so that the carrier signal then has exactly the correct phase for demodulation of the (B−Y) component.

When on the other hand switch 17 switches in the opposite phse, that is to say, when switch 17 is in position 2 → 3 during a first line period and is in position 1 → 3 during a second line period, the phase as given by equation (15) would apply as the phase for the output signal from oscillator 16. Since this part of line *a* is located to the right of line *b*, this means that the projections of the phasors $\overline{b}_1$ and $\overline{b}_2$ result in a negative voltage. This means that phase discriminator 25 provides a negative output voltage which is applied through the smoothing network 26 to the switch 23 so that switch 23 is set in the 2 → 3 position in that case. As a result the output signal from oscillator 16 directly reaches the input 24 so that the (B−Y) component can again be demodulated in the correct manner.

One possible embodiment of switch 23 is shown in FIG. 5. In this Figure a diode 27 is provided between the contacts 1 and 3 and a diode 28 is provided between the contacts 2 and 3. The cathode of diode 27 is connected to contact 1 and its anode is connected to contact 3. The anode of diode 28 is connected to contact 2 and its cathode is connected to contact 3. The output voltage of smoothing network 26 is applied to the diodes 28 and 27 through the resistors 29 and 30, respectively. As stated hereinbefore the output voltage of smoothing network 26 is positive when contacts 1 and 3 are to be connected together which is actually effected because the positive voltage renders diode 27 conducting through resistor 30 and blocks diode 28. When on the other hand contacts 2 and 3 are to be connected together, smoothing network 26 provides a negative voltage so that then diode 28 becomes conducting and diode 27 is blocked.

As already described in the preamble any control for adjusting the correct phase is always effected at a direct voltage and this at the direct voltages derived from networks 15 and 26. Since these networks have a relatively long time constant, this means that there is substantially no interference because they are practically removed by integrations.

Switch 23 may alternatively be controlled with the aid of a bistable trigger circuit such as, for example, a Schmitt trigger. It will be evident that switch 23 may be arranged in the signal path between the second bandpass filter 5 and the second demodulator 7 instead of being connected between contacts 1 and 2 and input 24 of demodulator 7. In this case an extra 180° phase-shifting network is to be provided between bandpass filter 5 and contact 1 of switch 23 while on the other hand contact 2 is to be connected directly to the output of bandpass filter 5. In this manner the phase of the colour signal is adapted by means of switch 23 to the phase of the carrier signal provided by oscillator 16.

It is likewise to be noted that colour killing and automatic colour control (ACC) may be effected by separate rectification of the burst signal derived from gate 8 and by applying this signal to a control electrode of the amplifier element incorporated in bandpass filter 5. The polarity of the rectified signal must be such that bandpass filter 5 is rendered conducting thereby. When the colour signal drops out (hence no burst) bandpass filter 5 must be cut off.

In FIG. 4 in which corresponding components have as much as possible the same reference numerals as those in FIG. 1, a second embodiment is shown in which the switch 17 is also arranged in a so-called free-running manner, but in this case the second switch 23' is arranged in series with the output contact 3 of the first change-over switch 17. In this case the output signal from oscillator 16 is directly applied through a control loop 21' to phase discriminnator 14. This means that oscillator 16 is adjusted in such a manner that its phase coincides with that of line $b$ in FIGS. 2 and 3. Particularly this phase is to be located on the part of line $b$ above line $a$. This may be obtained by adjusting oscillator 16 in the correct manner as a function of the polarity of the direct voltage derived from network 15. In fact, burst $\overline{b}_1$ which occurs during the first line period will yield a positive output voltage when it is projected on the part of line $b$ above line $a$ while phasor $\overline{b}_2$ yields a negtive voltage during the second line period under the same circumstances. Both voltages combined exactly yield an outut voltage of zero and consequently the said adjustment is stable. By delaying the output signal from oscillator 16 through a phase-shifting network 31 over 90°, the correct phase for the carrier signal which is to be applied to the input 24 of demodulator 7 is again exactly obtained.

However, since switch 17 is free-running, this means that during one line period contacts 1 and 3 are connected together and during the other line period contacts 2 and 3 are connected together. If it is assumed that contacts 1 and 3 are connected together when burst $\overline{b}_1$ occurs, the projection of this burst on the line section $b$ above line $a$ yields a positive output voltage provided by phsae discriminator 25, which means that switch 23 is then to be set in position 1 → 3 so as to be able to demodulate the +(R−Y) component which occurs together with burst $\overline{b}_1$. The burst $\overline{b}_2$ and the component −(R−Y) occur during the second line period. Contacts 2 and 3 of switch 17 are then connected together so that the output voltage at contact 3 of switch 17 coincides with the line section $b$ below line $a$. The burst $\overline{b}_2$ projected on this lower line section likewise yields a positive voltage so that switch 23′ is maintained in position 1 → 3. This, however, is again exactly the correct position because the signal at the output of switch 17 has the correct phase to demodulate the −(-R−Y) component in demodulator 6.

When on the other hand switch 17 is to be changed over exactly in the opposite phase, this means that switch 17 is in position 2 → 3 when the +(R−Y) component occurs and is in position 1 → 3 when the −(-R−Y) component is present. However, in that case the burst $\overline{b}_1$ yields a negative output voltage in phase discriminator 25 which sets 23′ to the other position i.e., the position when contact 2 is connected to contact 3. As is evident from FIG. 4 a second phase-shifting network 32 shifting the phase over 180° is arranged between output contact 3 of switch 17 and input contact 2 of switch 23′. This results in the signal shifted 180° in phase shifting network 22 being shifted again 180° in network 32 so that exactly the desired phase corresponding to the line section $b$ above line $a$ is obtained. During the subsequent line, when switch 17 is in position 1 → 3, burst $\overline{b}_2$ occurs. Again the phase discriminator 25 provides a negative voltage so that switch 23′ is maintained in position 2 → 3. The output signal from oscillator 16 is then exclusively shifted 180° in phase-shifting network 32 and then acquires exactly the phase to demodulate the −(R−Y) component which occur together with the burst $\overline{b}_2$ during that line period.

Also in the arrangement of FIG. 4 it has therefore been achieved that, irrespective of the position of switch 17, the demodulator 6 receives the subcarrier signal at the correct phase.

Since switch 23′ of FIG. 4 operates in exactly the same manner as switch 23 of FIG. 1, it may likewise be formed in the manner as shown in FIG. 5 or it may be formed with the aid of a bistable trigger circuit.

Likewise the carrier signal for phase discriminator 25 may be derived from contact 3 of change-over switch 23′ instead of from contact 3 of change-over switch 17. In that case, however, change-over switch 23′ is to be set through an additional gate and a bistable trigger circuit because switch 23′ is not to change over once it has its correct position.

Also for the embodiment of FIG. 4 there applies that controlling is exclusively effected at direct voltages so that the slight interference sensitivity is maintained in this case too. It will be evident that a so-called passive integrator maay alternatively be used for oscillator 16 of FIG. 4. This means that oscillator 16 is not of the self-generating type (hence a crystal having an active element and a positive feedback) but the crystal is directly excited by the burst signals and then freely oscillates at its owwn frequency. This own frequency may be readjusted if desired by means of, for example, a varactor diode whose capacitive value is varied by the control voltage derived from phase discriminator 14.

This is in principle also possible in the circuit according to FIG. 1. In that case, however, the output signal from the passive integrator is to be applied to a phase discriminator through a first change-over switch (for example, 23′ which is to be set only from one to the other position). The burst signal is likewise applied to the phase discriminator through a second change-over switch (such as, for example 17) controlled by the change-over signal generator 20 and a second gate keyed at the line frequency. The output voltage of the phase discriminator then serves on the one hand to recontrol the passive integrator and on the other hand to set the first change-over switch to its correct position through a bistable trigger circuit.

In FIG. 4 the contacts 1, 2 and 3 of switch 23, and network 32 may be arranged in the signal path between the second bandpass filter 5 and the first demodulator 6 instead of in series with the switch 17. The supply of the colour signal to the demodulator 6 is then adapted to the phase at which change-over switch 17 changes over.

Although in the embodiment of FIG. 1 a so-called simple PAL colour television receiver is shown, it will be evident that the principle of the invention may be used without any problem for a so-called PAL-de-luxe receiver.

In that case the second bandpass filter 5 should not be directly connected to the demodulators 6 and 7, but through a delay line as is shown in FIG. 6. FIG. 6 shows a delay line 33 whose input is connected to the output 34 of the second bandpass filter 5. Two resistors 35 and 36 are connected between output 34 and earth. A variable tap 37 is provided on resistor 35 which tap leads to the junction of two resistors 38 and 39 which are arranged between two outputs 40 and 41 of the delay line 33. In this known manner it is achieved that exclusively the carrier-modulated modulated red colour difference signal R−y is obtained at the output 40 and the blue colour difference signal B−y is obtained at the output 41. These signals can then be demodulated in demodulators 6 and 7, respectively. As is known, the advantage of using a delay line is that averaging over two line periods is then effected electrically and not visually as in the case for a simple PAL receiver. In addition the occurrence of a mosaic pattern is prevented by the use of a delay line. It is then also possible to derive the burst signals for phase discriminators 14 and 15 from the outputs 40 and 41. Then, however, two gating circuits instead of one are to be used, as is shown in FIGS. 1 and 4. For example, in the case of FIG. 4 the output 40 may be connected to an input of phase discriminator 25 through a first gating circuit which is keyed at the line frequency, while the output 41 is connected through a second gating circuit to the phase discriminator 14. It is true that this requires two gating circuits but it has the advantage over the embodiments of FIGS. 1 and 4 that burst signals having larger amplitudes are obtained so that possible noise will be less troublesome.

The embodiment of FIG. 7 in which corresponding components have as much as possible the same reference numerals as those in FIGS. 1 and 4 may be considered as a modification to the embodiment of FIG. 1 in which, however, the change-over switches 17 and 23 are connected between the output of the second bandpass filter 5 and the inputs of the demodulators 6 and 7 and in which a second gate 8' is arranged between the output of the second bandpass filter 5 and phase discriminator 25. The second gate 8', likewise as gate 8, is controlled by the signal of line frequency. At the same time, however, the colour signal for selecting the burst signals $\overline{b}_1$ and $\overline{b}_2$ is applied to gate 8 from the output contact 3 of change-over switch 17.

Change-over switch 17 is controlled by the change-over signal generator 20 in the rhythm of line frequency $f_H$. Assuming the switch 17 to be in position 1 → 3 during the first line period, hence the period when the +(R−Y) component and the burst $\overline{b}_1$ occur, the output signal at contact 3 is the signal as shown at 42 in FIG. 7b. The signal at contact 3 of switch 17 will be the signal as shown at 43 in FIG. 7 during the second line period, i.e., the period when the −(R−Y) component and the burst $\overline{b}_2$ occur. In that case oscillator 16 will be adjusted at a phase which corresponds to a signal as given by equation (9'). In fact, in that case the product of burst $\overline{b}_1$ and the output signal $V_{16}$ provides a positive output voltage $V_{14}$ during the first line period at the output of the first phase discriminator 14.

During the second line period the product of burst $\overline{b}_2$ and the output signal $V_{16}$ (which is not switched through, control loop 21) provides a negative output voltage $V_{14}$ at the output of phase discriminator 14. These positive and negative voltages $V_{14}$ will exactly eliminate each other after integration so that the output voltage $V_{15}$ of the network 15 is zero. At this phase of the change-over rhythm of change-over switch 17 the state given by equation (9') is therefore stable. The output signal from oscillator 16 is shifted −90° through the phaseshifting network 18 and since the (R−Y) component on line after line is already adjusted at the same phase by change-over switch 17 (see the situation shown at 42 and 43 in FIG. 7) a correct demodulation takes place in demodulator 6.

For the above-described phase of the change-over rhythm of change-over switch 17, switch 23 is to be in position 1 → 3. In fact, in that case the (B−Y) component has a phase as shown at 43 in FIG. 7 and the signal derived from oscillator 16 has exactly the correct phase to demodulate this component in demodulator 7 in the correct manner.

The fact that the second phase discriminator 25 maintains the change-over switch 23 in this position may be evident as follows. The burst signal $\overline{b}_1$ has a position as shown at 42 during the first line period and the burst $\overline{b}_2$ has a position as shown at 43 during the second line period. Since on the other hand the carrier signal is applied from the output of filter 18 to the second phase discriminator 25 it has a phase as given by $$V_{18} = \cos W_h t \qquad (18)$$

Both the product of burst $\overline{b}_1$ and $V_{18}$, and of burst $\overline{b}_2$ and $V_{18}$ yield a positive voltage so that after an integration in network 26 switch 23 is put in position 1 → 3.

It will be evident that it may be reasoned in a similar manner that the output signal from oscillator 16 is given by equation (15) when switch 17 connects contacts 2 and 3 together during the first line period, i.e., the period when the burst $\overline{b}_1$ and the +(R−Y) component occur and connects the contacts 1 and 3 together during the second line period, i.e., when the burst $\overline{b}_2$ and the −(R−Y) component occur. In this situation phase discriminator 25 ensures that switch 23 is put in position 2 → 3.

It will likewise be evident that, if desired, change-over switch 23 in FIG. 7 may be moved to the signal path between oscillator 16 and input 24 of demodulator 7. An extra phase-shifting network is then necessary which is connected to contact 1 of switch 23 while contact 2 is directly connected to the output of oscillator 16.

The embodiment according to FIG. 8 in which the components again have as much as possible the same reference numerals as those in the previous Figures may be considered as a modification to the embodiment according to FIG. 4. In FIG. 8 the change-over switches 17 and 23' are arranged in the colour signal path between the second bandpass filter 5 and the first demodulator 6, Synchronisation of oscillator 16 is effected in exactly the same manner as in the arrangement according to FIG. 4. However, to see whether the change-over switch 17, which likewise as the one in FIGS. 1, 4 and 7 is free-running, changes over to one or the other phase, it is necessary to derive the signal between the change-over switches 17 and 23' and to apply this signal to the second phase discriminator 25 through a second gate 8' which likewise as gate 8 is keyed by the signal of line frequency. Dependent on the phase at which change-over switch 17 changes over, a positive or negative voltage appears at the output of network 26, which voltage sets change-over switch 23' to position 1 → 3 or 2 → 3.

Also in the circuit arrangement according to FIG. 8 it is possible to move switch 23' to the lead between the output of oscillator 16 and input 19 of demodulator 6.

Furthermore it is to be noted that the oscillator 16 in the circuit arrangement according to FIG. 8 may be formed as a passive oscillator as described with reference to FIG. 4.

In FIG. 9 the circuit arrangement has an input 201 for applying a PAL chrominance signal. The input 201 is connected to an input 203 of a signal path splitting 205 which has two outputs 207 and 209. The signal path splitting 205 may be in interconnection from the input 203 to the outputs 207 and 209 such as in PAL receivers without electronic error averaging or with video frequency error compensation, or a quadrature component splitter including, for example, a delay line such as in PAL receivers employing chroma frequency phase error compensation.

The outputs 207 and 209 are connected to inputs 211 and 213 of synchronous colour difference signal demodulators 215 and 217 to which the chrominance signal or the relevant quadrature component thereof is applied.

An input 219 of a burst signal gate 221 is connected to the input 201. A gating pulse signal of line frequency is applied to an input 223 of the burst signal gate 221 so that only the burst signal appears at an output 225 which signal, as is known for the currently used PAL systems, alternately assumes a phase of 135° or 225° relative to the phase of a subcarrier-modulated positive (B—Y) signal.

The output 225 of the burst signal gate 221 is connected to an input 227 of a subcarrier regenerator circuit 229 which in this case is formed as a passive integrator, i.e., a filter circuit for the subcarrier component. A subcarrier signal having the phase of a subcarrier-modulated positive (B—Y) colour difference signal is obtained at an output 231 of the passive integrator 229, which signal is applied at one end to a further input 233 of the synchronous demodulator 215 and at the other end to an input 235 of a 90°-phase-shifting network 237 an output 239 of which is connected to an input 241 of an identification signal detector 243 for supplying a reference signal.

The identification signal detector 243 has a further input 245 which is connected to the output 225 of the burst signal gate 221 and to which the burst signal having the alternating phase is applied. When a PAL signal is received a demodulated colour burst signal having a component of half the line frequency appears at an output 247 of the identification signal detector 243. This demodulated signal is applied to an input 249, connected to the output 247, of a half-line frequency phase detector 251.

A further input 253 of the half-line frequency phase detector 251 is connected to an output 255 of a change-over signal generator 257 an input 259 if which is a pulse signal input of line frequency. The change-over signal generator 257 is a frequency divider circuit, for example, a bistable multivibrator which applies a change-over signal of half the line frequency to the previously mentioned output 255 and to an output 261.

When a PAL signal is received the half-line frequency phase detector 251 applies, for example, a positive or a negative voltage to an output 263 dependent on whether the change-over signal generator 257 is in step or is not in step with the half-line frequency component of the identification signal applies to input 249.

The output 261 of the change-over signal generator 257 is connected to an operating signal input 265 of a change-over switch 267 which has two inputs controlled inversely relative to each other by the output 239 of the 90° phase-shifting network 237, and an output 269 at which a reference signal alternating 180° in phase from line to line becomes available.

This reference signal having a phase alternating from line to line is applied to an input 271, connected to the output 269, of a further change-over switch 273. An operating signal input 275 of this change-over switch 273 is connected to the output 263 of the half-line frequency phase detector 251.

Two outputs of the change-over switch 273 are connected directly and through a 180° phase shifter 277, respectively, to an input 279 of synchronous detector 217.

A reference signal having a phase alternating from line to line consequently is applied to the input 279 of the synchronous detector 217, which phase due to the further change-over switch 273 independent of the phase location of the half-line frequency component in the identification signal relative to the output signal from the change-over signal generator always is correct relative to the phase of the (R—Y) chrominance signal component to be detected also having an alternating phase and being applied to the input 213.

The latter may be evident as follows: assume that the phase of the said reference signal at the input 279 is 180° wrong, then this is caused by an incorrect switching condition of change-over switch 267 so that an incorrect phase of the output signals from change-over signal generator 257 occurs. The half-line frequency phase detector 251 will then provide a negative voltage so that a 180° phase shift is caused by the further change-over switch 273 as a result of the negative output voltage of the half-line frequency phase detector 251 which voltage is applied to the operating signal input 275. In case of a correct switching condition of change-over switch 267 the output voltage of the half-line frequency phase detector 251 will be positive and the further change-over switch 273 will pass the reference signal unchanged in phase. The reference signal at the input 279 of the synchronous detector 217 thus always has the desired phase as a result of the correction with the aid of the further change-over switch 273.

By using the half-line frequency phase detector 251 an identification which is very insensitive to interference may be effected. Due to the step according to the invention, the operation of a further change-over switch which is not incorporated in the loop with the phase detector and the change-over signal generator, a quick uniform phase correction of the reference signal for the (R—Y) detector is obtained. In fact, this correction occurs immediately as soon as a faulty switching condition is detected because the correction does not have any influence on the output voltage of phase detector 251 so that this detector maintains, during correction, the full output voltage which is associated with the detected switching condition.

It will be evident that the order of the change-over switches 267 and 273 may be changed, if desired, or that one of these switches or both can be incorporated in the input signal path to the other input 213 of the synchronous detector 217.

The phase change-over switch 273, 277 may be further incorporated, for example, in the operating signal supply to the operating signal input 265 of change-over switch 267.

Furthermore it will be evident that instead of a passive integrator it is alternatively possible to use, for example, an active subcarrier regenerator or a combination of these circuits.

The circuit arrangement of FIG. 10 in which corresponding components have the same reference numerals as those in FIG. 9 mainly differs from that of FIG. 9 in that the change-over switches 267 and 273 are incorporated in different signal paths while furthermore an active subcarrier regenerator 228 having an output 232 and a phase control signal input 234 is used. The phase control signal input 234 is connected to a direct voltage output 248 of the identification signal detector 243 while the output 232 of generator 228 is connected to the input 233 of the synchronous colour difference demodulator 215 and the input 235 of the 90° phase shifting network 237.

The change-over switch 267 is incorporated between the input 201 of the circuit arrangement and the input 219 of the burst signal gate 221 connected to the input 213 of the synchronous demodulator 217. Dependent on the switching condition of the change-over signal generator 257 a burst signal is obtained at the output 225 of the burst signal gate 221, which signal alternate + and −45° in phase relative to the positive or the negative (R−Y) phase of the subcarrier signal so that the generator 228 will provide a signal having the positive or the negative (B−Y) phase for its output 232. It will be evident that as a result of the same influence of the change-over switch 267 in the two signal paths to the identification signal detector 243 the switching condition of the change-over signal generator 257 has no influence on the phase of the alternating voltage component at the output 247 of the identification signal detector 243 so that this switching condition can be detector by the half-line frequency phase detector 251 as is shown in the circuit arrangement of FIG. 9.

The phase of the reference signal at the input 279 of the colour difference signal demodulator 217 may correspond, dependent on the switching condition, to the positive or negative (R−Y) phase in the chrominance signal applied to the input 201. Accordingly the phase of the signal to be demodulated and applied to the input 213 of the demodulator 217 is adapted as will be described hereinafter.

Let is be assumed that the chrominance signal Chr applied to the input 201 has two quadrature components U and jV and can be written during the line periods $n$, $n$+2, $n$+4, . . . as U+$j$V and during the line periods $n$+1, $n$+3, . . ., as U−$j$V. Let it be assumed that the switching condition of the change-over switch 267 is such that during the line periods $n$, $n$+2, . . . no phase inversion occurs and during the line periods $n$+1, $n$+3, . . . a phase inversion occurs. A signal U+$j$V is then produced during the line periods $n$, $n$+2, . . . at the output 269 of the change-over switch and a signal −U+$j$V is produced during the line periods $n$+1, $n$+3, . . . The component $j$V having the original alternating phase has then obtained a constant phase while the component having the original constant phase U now exhibits a phase alternation. It will be readily evident that for a different switching condition of change-over switch 267 the output signal thereof is alternately −U−$j$V and +$u$−$j$V. It appears therefrom that the component $j$V with the originally alternating phase is then 180° shifted and that in that case it has a constant phase. The important signals at the inputs of the synchronous demodulator 217 are thus not influenced in their relative phase location by the switching condition of change-over switch 267.

The compensate also for the influence of the switching condition of change-over switch 267 on the synchronous demodulator 215 the further change-over switch 273 adapts the phase of the signal to the input 211 of the synchronous demodulator 215 by means of the output signal from the half-line frequency phase detector 251 which signal is applied to the operating signal input 275.

The remarks made with reference to possible modifications of the circuit of FIG. 9 may alternatively be used in an adapted form in this case. An exchange of the change-over switches 267 and 273 is, however, not quite possible in this case.

In this circuit arrangement a possible error compensation is preferably performed at the video frequency because special provisions are required for maintaining the signals and phase relations desired for different positions when using a quadrature component splitting circuit.

Furthermore it will be evident that the circuit arrangement may have many forms varying between those of FIG. 9 and FIG. 10.

In FIG. 11 in which corresponding components have the same reference numerals as in FIGS. 9 and 10 the circuit arrangement has an input 291 for the supply of a SECAM chrominance signal. The input 291 is connected through an attenuation network (not shown) to an input 293 and through a delay line 295 to an input 297 of a sequential simultaneous change-over switch 299. Outputs of this change-over switch 299 are connected to frequency demodulators 301 and 303 for obtaining colour difference signals.

Furthermore a burst gate 305 is connected to the input 291 which gate passes a burst signal prior to the commencement of each line scanning period to an identification signal detector 307 which is a frequency demodulator in this case.

An output 309 of the identification signal detector 307 is connected to the input 249 of the half-line frequency phase detector 251. The output 261 of the change-over signal generator 257 is connected to the input 253 of the phase detector 251 while each of the outputs 255 and 261 of the change-over signal generator 257 which convey signals in phase opposition through the further change-over switch 273 can be connected to an operating signal input 311 of the change-over switch 299 under the influence of the output signal from phase detector 251. The switching condition of the change-over switch 299 is therefore adapted immediately and uniformly to the phase of the output voltage of change-over signal generator 257.

When switching voltages in phase opposition are required for the change-over switch 299 either a push-pull circuit or a second change-overcontact may be used in the further change-over switch 299.

For each of the said arrangements described it is furthermore possible to incorporate the further change-over switch in an output circuit of a colour difference signal demodulator. A correction of the output signal from the change-over signal generator as described with reference to FIG. 11 is of course also possible for PAL receivers.

Colour killing on the output signal of the phase detector 251 may be used when a convertor is controlled to an absolute value with this output signal such as, for example, a first transistor controlled between emitter and base whose collector constitutes the output for a colour killing signal and which is interconnected to the collector of a second transistor whose base is connected to the emitter of the first transistor and whose emitter is connected to the base of the first transistor.

Although change-over switches are mentioned above which alternately cause phase shifts of 0° and 180°, phase shifts of $\alpha$ and $\alpha \pm 180°$ on the chrominance frequency may sometimes be desired when they are used in the signal paths. It will be evident that such phase shifts are principally possible for the circuit arrangements according to the invention.

FIG. 12 shows a chrominance signal input 401 which is connected to an input 403 of an adder circuit 405. A further input 407 of the adder circuit 405 is connected to an output 409 of a mixer circuit 411 an input 413 of which is connected to the chrominance signal input 401.

A further input 415 of the mixer circuit 411 is connected to an output 417 of a frequency doubler 419 an input 421 of which is connected to an output 423 of a first chrominance subcarrier regenerator 425. A colour burst input 427 of the chrominance subcarrier regenerator 425 is connected to an output 429 of a gating circuit 431 an input 433 of which is connected to the chrominance signal input 401 and a further input 435 of which receives a gating signal with the aid of which a colour burst is selected from the chrominance signal applied to the input 433 and is passed on through the output 429 to the first chrominance subcarrier regenerator 425. The first chrominance subcarrier regenerator 425 generates a carrier which has a phase corresponding to the phase of a positive blue chrominance subcarrier-modulated colour difference signal at the chrominance signal input 401. The frequency doubler 419 doubles this signal in frequency and applies it to the input 415 of the mixer circuit 411.

As a result the mixer circuit 415 provides a chrominance signal at its output 409 which signal has a phase which relative to the phase of the blue colour difference signal is located in reverse to the phase of the chrominance signal at its input 413.

Consequently chrominance signals having opposite red colour difference signal components appear at the inputs 403 and 407 of the adder circuit 405. A red colour difference component is no longer present at an output 437 of the adder circuit 405. Possible errors in the blue colour difference signal components are substantially compensated for in a compensation circuit connected to the output 437 of the adder circuit 405 which compensation circuit includes a delay line 439 and an adder circuit 441 for an undelayed signal and a signal delayed over one line period.

An output 443 of the adder circuit 441 is connected to an input 445 of a first synchronous demodulator 447 and supplies to said input a blue colour difference signal component to be demodulated of the chrominance signal. A further input 449 of the first synchronous demodulator 447 is connected to the output 423 of the first chrominance subcarrier generator 425 and receives a reference signal therefrom for the synchronous demodulation of the signal to be demodulated, applied to the input 445.

The output 429 of the gating circuit 431 is furthermore connected through a phase change-over switch 451 to an input 453 of a second chrominance subcarrier regenerator 455 an output 457 of which is connected to an input 459 of a second synchronous demodulator 461.

A further input 463 of the second synchronous demodulator 461 is connected to an output 465 of an adder circuit 467 which is connected directly and through a delay line 469 to an output 471 of a subtractor circuit 473. Two inputs 475, 477 of the subtractor circuit 473 are connected through a phase change-over switch having two change-over contacts 479 and 481 to the output 409 of the mixer circuit 411 and to the chrominance signal input 401 of the circuit, respectively.

The change-over contacts 479 and 481 are changed over from line to line simultaneously with the phase change-over switch 451 as a result of an output signal from a change-over signal generator 483 an input 485 of which receives a line-frequency occurring pulse, for example, a line flyback pulse.

Consequently, the inputs 475 and 477 of the subtractor circuit 473 convey a reversed and non-reversed chrominance signal during one line period and a non-reversed and reversed chrominance signal during the next line period, respectively. During one line period the non-reversed chrominance signal is subtracted from the reversed signal in the subtractor circuit 473 and during the next line period the reversed chrominance signal is subtracted from the non-reversed chrominance signal. Dependent on the switching order relative to the order of a phase alternation in the chrominance signal this results in a positive or a negative red colour difference signal component of the chrominance signal of the input 471 of the subtractor circuit. This switching order is not synchronized with the change-over order in the transmitter due to the absence of an identification system.

Dependent on this switching order a burst which relative to the positive or the negative red colour difference signal phase alternates + and − 45° appears at the input 453 of the second chrominance subcarrier regenerator 455. A reference signal for the second synchronous demodulator 461 is then obtained with the aid of this colour burst at the output 457 of the second chrominance subcarrier regenerator 455 which reference signal is in phase with the colour difference signal component to be demodulated and applied to the input 463 at any change-over order of the change-over switches 451, 479, 481.

The chrominance subcarrier regenerator 425 and 455 may be, for example, of a passive type and may constitute a filter circuit, but they may alternatively be of an active type controlled by a phase control loop or of a synchronous type, or they may be constituted by a combination of a plurality of these types.

Furthermore additional phase shifts of $\alpha°$ may be provided in the signal paths to or from the phase change-over switches so that the corresponding output signals alternate 180° from line to line relative to a different phase angle, $\alpha$ ° different from the original one.

In FIG. 13 corresponding components of the circuit arrangement have the same reference numerals as those in FIG. 12. The circuit arrangement of FIG. 13 differs from that of FIG. 12 by the absence of electronic error compensation means and furthermore by the presence of a further phase change-over switch 480 which is now incorporated in the signal path from the output 457 of the second chrominance subcarrier regenerator 455 to the input 459 of the second synchronous demodulator and not in the signal path for the signal to be demodulated, as in FIG. 12.

The operation as regards demodulation of the blue colour difference signal component may be sufficiently known to those skilled in the art. The fact that the demodulation of the red colour difference signal component is effected in the desired manner, although an identification system for coupling the change-over order of the change-over switches 451 and 481 is absent for the change-over order of the transmitter may be evident as follows:

Dependent on the change-over order of the change-over switch 451 the second chrominance subcarrier regenerator 455 applies a reference signal to its output 457 which correspond to the phase of a positive or a negative red colour difference signal component in the chrominance signal at the chrominance signal input 401.

Likewise dependent on this change-over order the phase change-over switch 480 alternately provides a phase shift of 0° and 180° or alternately a phase shift of 180° and 0° for the reference signal at the input 459 of the second synchronous demodulator. Possible inversion of the change-over order thus results twice in a shift of 180° so that the reference signal at the input 459 of the second synchronous demodulator 461 is always in the same phase relative to the signal to be demodulated and independent of this change-over order.

If desired an error compensation may of course be performed in this case, for example, by using a PAL decoder in front of the demodulators or by using video frequency error compensation circuits. Furthermore the remarks regarding the chrominance subcarrier regenerator and phase change-over switches apply likewise as for FIG. 12.

In FIG. 14 corresponding components have the same reference numerals as those in FIGS. 12 and 13. There is provided a further gating circuit 430 an output 428 of which is connected to the input 453 of the second chrominance subcarrier regenerator 455 and an input 432 of which is connected to an output of the phase change-over switch 451 which is now connected to the chrominance signal input 401. The output of phase change-over switch 451 is also connected to the input 463 of the second synchronous demodulator 461. The gating circuit 430 has an input 434 to which a gating pulse is applied.

Video frequency error compensation circuits 487 and 489 are shown at the outputs of the synchronous demodulators 447, 461, which circuits include delay circuits 491 and 493, respectively, which may be of a shift-storaged type and in that case receive their shift command signal from the chrominance subcarrier regenerators as is shown by broken lines in the Figure.

As regards demodulation of the blue colour difference signal component from the chrominance signal the circuit is in conformity with the conventional circuits and its operation may be assumed to be known.

As regards the demodulation of the red colour difference signal component the operation is as follows:

Dependent on the change-over order of the change-over switch 451, which is not synchronized by identification signals, both the component of the colour burst of the alternating red colour difference signal phase and the corresponding component of the chrominance signal are shifted in phase alternately 0° and 180° or 180° and 0°. Dependent on the change-over order these components both have a phase location of 0° or of 180° relative to the positive red colour difference signal in the chrominance signal at the chrominance signal input 401. The second synchronous demodulator 461 thus receives signals from line to line having mutually the same phase location independent of the change-over order of the change-over switch 451.

It will be evident that the remarks made with reference to FIGS. 12 and 13 regarding the types of chrominance subcarrier regenerators also apply in this case. A PAL decoder may also be used in a suitable manner for error compensation.

Furthermore different modifications of the circuit arrangements described may occur, which are within the scope of the present invention.

Synchronous demodulators are understood to mean demodulators which require in one way or other a recovered carrier signal for the demodulation of the chrominance signal. Also envelope demodulators for a combination of these two signals may be used for this purpose.

What is claimed is:

1. A circuit comprising input means for receiving a color information signal having an alternating characteristic from line to line and a line frequency synchronization signal, a first change-over switching means coupled to said input means to receive at least a portion of said color signal for compensating for said alternating characteristic, a generator having an input means for receiving only a line frequency signal, and an output means coupled to said switching means for control of the switching state of said switching means without regard to phase ambiguity between the state of the alternating characteristic and the state of said switching means, and means coupled to said switching means for correcting the results of any of said phase ambiguity without affecting the state of said switching means.

2. A circuit as claimed in claim 1 wherein said color information signal comprises a line frequency alternating phase color burst subcarrier and two color component signals, one of said components having a line frequency alternating phase said correcting means comprising frequency gated gate means coupled to said input means for providing said color burst, a first phase discriminator coupled to said gate, a subcarrier regenerator coupled to said discriminator, first and second synchronous demodulator means coupled to input means for demodulating said alternating and remaining component signals respectively, said first demodulator being coupled to said switching means for receiving said burst signal, a second phase discriminator coupled to said regenerator and said gate, and a second change-over switching means coupled to said second discriminator for control thereof.

3. A circuit as claimed in claim 2 wherein said first switching means comprises an output coupled to an input of one of said discriminators, and two inputs, one of said inputs being coupled to said regenerator, and further comprising means coupled between said remaining input and said regenerator for providing a 180° phase shift.

4. A circuit as claimed in claim 2 wherein said first switching means comprises an output directly connected to an input of said first discriminator, and two inputs; said second switching means comprising two inputs coupled to said first switching means inputs respectively, and an output coupled to said second demodulator; a 90° phase shifting network coupled between said first switching means output and said first demodulator, and said second discriminator being directly connected to said regenerator.

5. A circuit as claimed in claim 2 wherein the regenerator output is directly connected to said first discriminator, and further comprising a 90° phase shift network coupled between said regenerator and said second demodulator, said first switching means having an output directly connected to said second phase discriminator, said second switching means having a first input directly coupled to said first switching means output, a second input, and an output directly connected to said first demodulator andn means for providing a 180° phase shift coupled between said first switching means output and said second switching means second input.

6. A circuit as claimed in claim 2 wherein said first switching means comprises a pair of inputs coupled to said input means to receive said component and burst signals, and an output coupled to said first demodulator, said gate being coupled between said first switching means output and said first discriminator; said regenerator being directly connected to said first discriminator and to said second modulator; a 90° phase shift network coupled between said regenerator and to said first demodulator; a second gate coupled between one of said first switching means inputs and said second discriminator; said second discriminator having an input coupled to said first discriminator and an output coupled to control said second switching means, and said second switching means having a pair of inputs coupled to said first switching means inputs respectively, and an output coupled to said second demodulator.

7. A circuit as claimed in claim 2 wherein said first switching means comprises a first input coupled to said input means for receiving said component and burst signals, a second input, and an output; a first 180° phase shifting means coupled between said input means and said second input; a second line frequency keyed gate coupled between said output and said second discriminator; said second switching means having a first input coupled to said output, a second input, and an output coupled to said first demodulator; a second 180° phase shifting means coupled between said first switching means output and said second switching means second input; said regenerator being coupled to said second discriminator and to said first demodulator; and a 90 degree phase shifting means coupled between said regenerator and said second demodulator.

8. A circuit as claimed in claim 1 said correcting means comprising an identification signal means coupled to said input means for supplying a burst signal of one half the line frequency, a half line frequency phase detector having inputs coupled to said identification means and to said change-over generator respectively, and a correction second change-over switching means having a control input coupled to said half line frequency phase detector.

9. A circuit as claimed in claim 8 wherein said second switching means comprises a phase change-over switch coupled to said change-over signal generator.

10. A circuit as claimed in claim 8 further comprising a color demodulator having an input and wherein said color signal comprises a PAL signal and said second switching means comprises a phase switching means coupled to said demodulator input.

11. A circuit as claimed in claim 1 wherein said color signal comprises a PAL signal, said correcting means comprising first and second synchronous demodulators coupled to said input circuit, first and second subcarrier regenerators coupled to said demodulators respectively, and said change-over switching means comprising a first phase switching means independnet of identification signals coupled between said input means and said second demodulator.

12. A circuit as claimed in claim 11 further comprising a second phase switching means switching in accordance with said first phase switching means and coupled between said input means and said second regenerator.

* * * * *

UNITED STATES PATENT AND TRADEMARK OFFICE

CERTIFICATE OF CORRECTION

PATENT NO. : 3,877,066

DATED : April 8, 1975

INVENTOR(S) : CORNELIS JOHANNES VAN GILS ET AL

It is certified that error appears in the above-identified patent and that said Letters Patent are hereby corrected as shown below:

IN THE TITLE PAGE

Below "Appln. No" insert -- Foreign Application Priority Data

April 14, 1971 Dutch..............7104947
July 20, 1971 Dutch..............7109961
August 23, 1971 Dutch.............7111601 --;

Signed and Sealed this

*fourteenth* Day of *October 1975*

[SEAL]

*Attest:*

RUTH C. MASON
*Attesting Officer*

C. MARSHALL DANN
*Commissioner of Patents and Trademarks*